(12) United States Patent
Raskar et al.

(10) Patent No.: US 6,793,350 B1
(45) Date of Patent: Sep. 21, 2004

(54) PROJECTING WARPED IMAGES ONTO CURVED SURFACES

(75) Inventors: Ramesh Raskar, Cambridge, MA (US); Jeroen van Baar, Brookline, MA (US); Srinivasa G. Rao, Hyattsville, MD (US); Thomas H. Willwacher, Bad Marienberg (DE)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 10/458,386

(22) Filed: Jun. 10, 2003

Related U.S. Application Data

(63) Continuation-in-part of application No. 10/394,314, filed on Mar. 21, 2003.

(51) Int. Cl.[7] .................. G03B 21/00; G03B 21/26; G03B 21/14; G06K 9/00; G01C 17/00
(52) U.S. Cl. .................. 353/121; 353/94; 353/69; 353/122; 382/154; 702/152
(58) Field of Search .................. 353/69, 94, 121, 353/122, 30, 48, 82, 89, 70; 345/421, 422, 419, 423, 424, 425, 426, 427; 352/47; 348/383; 382/154; 702/152

(56) References Cited

U.S. PATENT DOCUMENTS

| | | | |
|---|---|---|---|
| 5,319,744 A | 6/1994 | Kelly et al. | 395/136 |
| 6,104,405 A | 8/2000 | Idaszak et al. | 345/427 |
| 6,549,651 B2 * | 4/2003 | Xiong et al. | 382/154 |
| 2002/0059042 A1 * | 5/2002 | Kacyra et al. | 702/152 |

OTHER PUBLICATIONS

Cruz–Neira et al., "Surround–screen Projection–based Virtual Reality: The Design and Implementation of the CAVE," SIGGRAPH 93 Conference Proceedings, vol. 27, pp. 135–142, 1993.

Staadt et al., "The blue–c: Integrating real humans into a networked immersive environment," ACM Collaborative Virtual Environments, 2000.

Chen et al., "Automatic Alignment of High–Resolution Multi–Projector Displays Using An Un–Calibrated Camera," IEEE Visualization, 2000.

Yang et al, "PixelFlex: A Reconfigurable Multi–Projector Display System," IEEE Visualization, 2001.

Humphreys et al., "A Distributed Graphics System for Large Tiled Displays," IEEE Visualization, 1999.

Humphreys et al., "WireGL: A Scalable Graphics System for Clusters," Proceedings of SIGGRAPH, 2001.

Raskar et al., "Seamless Projection Overlaps Using Image Warping and Intensity Blending," Fourth International Conference on Virtual Systems and Multimedia, 1998.

Wexler and Shashua, "Q–warping: Direct Computation of Quadratic Reference Surfaces," IEEE Conf. on Computer Vision and Pattern Recognition, CVPR, Jun., 1999.

Lu et al., "Fast and globally convergent pose estimation from video images," IEEE Transactions on Pattern Analysis and Machine Intelligence, vol. 22:6, pp. 610–622, 2000.

* cited by examiner

Primary Examiner—Russell Adams
Assistant Examiner—Melissa J Koval
(74) Attorney, Agent, or Firm—Dirk Brinkman; Andrew J. Curtin

(57) ABSTRACT

A method projects one or more image onto a curved display surface. First, a predetermined structured light pattern is projected onto the display surface. A stereo pair of images is acquired of the projected images on the display surface. Then, a quadric transfer function between the predetermined images and the stereo pair of images, via the display surface, is determined. Thus, an arbitrary output image can be warped according to the quadric transfer function so that when it is projected onto the display surface it appears correct.

18 Claims, 7 Drawing Sheets

Vertex Shader Code for Quadric Transfer Function

```
vertout main( appin IN, uniform float4x4 modelViewProj, uniform float4
constColor, uniform float3x3 A, uniform float3x3 E, uniform float3 e ) { vertout OUT;
    float4 m1 = float4(IN.position.x, IN.position.y, IN.position.z, 1.0f );
float4 m, mi ; float3 m2,mp; float scale;
m = mul( modelViewProj, m1);
m2.x = m.x/m.w; m2.y = m.y/m.w; m2.z = 1;
scale = mul(m2, mul(E,m2));
mp = mul(A,m2) + sqrt(scale)*e;
mi.x = m.w * (mp.x)/(mp.z);
mi.y = m.w * (mp.y)/(mp.z);
mi.zw = m.zw;
OUT.position = mi;
OUT.color0 = IN.color0; // Use original per-vertex specified color
return OUT;
}
```

PROJECTING WARPED IMAGES ONTO CURVED SURFACES

RELATED APPLICATION

This is a continuation-in-part application of U.S. patent application Ser. No. 10/394,314 "Geometrically Aware Projector" filed by Raskar et al. on Mar. 21, 2003.

FIELD OF THE INVENTION

This invention relates generally to projecting images, and more particularly to projecting images onto curved surfaces.

BACKGROUND OF THE INVENTION

Projector systems have been used to render large images onto display surfaces. With multiple projectors, it is possible to generate even larger seamless displays. Such systems are particularly useful for constructing immersive visualization environments capable of presenting high-resolution images for entertainment, education, training, and scientific simulation. Known multi-projector technologies include Cruz-Neira et al., "Surround-screen Projection-based Virtual Reality: The Design and Implementation of the CAVE," SIGGRAPH 93 Conference Proceedings, Vol. 27, pp. 135–142, 1993, Staadt et al., "The blue-c: Integrating real humans into a networked immersive environment," ACM Collaborative Virtual Environments, 2000.

A number of techniques are known for generating seamless images on planar surfaces using electro-optical techniques to determine registration and blending parameters, see Li et al., "Optical Blending for Multi-Projector Display Wall System," Proceedings of the $12^{th}$ Lasers and Electro-Optics Society, 1999, or using a camera in a loop, Surati, "Scalable Self-Calibrating Display Technology for Seamless Large-Scale Displays," Ph.D. Thesis, Massachusetts Institute of Technology, 1999, Chen et al., "Automatic Alignment of High-Resolution Multi-Projector Displays Using An Un-Calibrated Camera," IEEE Visualization, 2000, and Yang et al, "PixelFlex: A Reconfigurable Multi-Projector Display System," IEEE Visualization, 2001, Brown et al., "A Practical and Flexible Large Format Display system," Tenth Pacific Conference on Computer Graphics and Applications, pp. 178–183, 2002, Humphreys et al., "A Distributed Graphics System for Large Tiled Displays," IEEE Visualization, 1999, and Humphreys et al., "WireGL: A Scalable Graphics System for Clusters," Proceedings of SIGGRAPH, 2001.

When multiple projectors are used, an accurate estimation of the geometric relationship between overlapping images is key for achieving a seamless display. The geometric relationship influences the rendering process and soft edge blending. Camera-based methods, which exploit a homography expressed by a 3 by 3 matrix, admit casually installed projectors while eliminating cumbersome manual alignment.

The relationship for surfaces that adhere to quadric equations can be defined using a quadric image transfer function, see Shashua et al., "The quadric reference surface: Theory and applications," Tech. Rep. AIM-1448, 1994.

Multi-projector alignment for curved surfaces can be aided by projecting a 'navigator' pattern and then manually adjusting the position of the projectors. For a large scale display, such as used at the Hayden Planetarium in New York, it takes technicians several hours each day to align seven overlapping projectors.

One problem is that when 3D images are displayed on a curved screen, the images are perspectively correct from only a single point in space. This 3D location is known as the virtual viewpoint or 'sweet-spot'. As the viewer moves away from the sweet-spot, the images appear distorted. For very large display screens and many view points, it is difficult to eliminate this distortion. However, in real-world applications, viewers would like to be at the exact same place where the projectors ideally need to be located. In addition, placing projectors at the sweet-spot means using a very wide-field of view projectors, which are expensive and tend to have excessive radial or 'fish-eye' distortion.

In another method, a non-parametric process places a camera at the sweet-spot. The camera acquires an image of a structured light pattern projected by the projector. Then, in a trial-and-error approach, samples are taken, to build an inverse warping function between a camera input image and a projected output image by means of interpolation. Then, the function is applied, and resampled until warping function correctly displays the output image, see Jarvis, "Real Time 60 Hz Distortion Correction on a Silicon Graphics IG," Real Time Graphics 5, pp. 6–7, February 1997, and Raskar et al., "Seamless Projection Overlaps Using Image Warping and Intensity Blending," Fourth International Conference on Virtual Systems and Multimedia, 1998.

It is desired to provide a parametric method for aligning multiple projectors that extends the homography-based approach for planar surfaces to quadric surfaces.

In computer vision, some work has been done on using quadric formulations for image transfer functions, see Shashua et al., above, and Cross et al., "Quadric Surface Reconstruction from Dual-Space Geometry," Proceedings of $6^{th}$ International Conference on Computer Vision, pp. 25–31, 1998. However, the linear methods intended for cameras, as described below, produce large errors when used with projectors, instead of cameras.

In multi-projector systems, several techniques are known for aligning images seamlessly on flat surfaces using planar homography relationships. However, there has been little work on techniques for parameterized warping and automatic registration of images displayed on higher order surfaces.

This is a serious omission because quadric surfaces do appear in many shapes and forms in projector-based displays. Large format flight simulators have traditionally been cylindrical or dome shaped, see Scott et al., "Report of the IPS Technical Committee: Full-Dome Video Systems," The Planetarian, Vol. 28, p. 25–33, 1999, planetariums and OnmiMax theaters use hemispherical screens, Albin, "Planetarium special effects: A classification of projection apparatus," The Planetarian, Vol. 23, pp. 12–14, 1994, and many virtual reality systems use a cylindrical shaped screen.

Therefore, it is desired to provide calibration methods, quadric transfer functions, and parametric intensity blending for images projected onto a curved display surface.

SUMMARY OF THE INVENTION

Curved display screens are increasingly being used for high-resolution immersive visualization environments. The invention provides a method and system for displaying seamless images on quadric surfaces, such as spherical or cylindrical surfaces, using a single or multiple overlapping projectors. A new quadric image transfer function is defined to achieve sub-pixel registration while interactively displaying two or three-dimensional images.

BRIEF DESCRIPTION OF THE DRAWINGS

FIG. 5 is vertex shader code for a quadric transfer function according to the invention;

DETAILED DESCRIPTION OF THE PREFERRED EMBODIMENT

Figure 3:
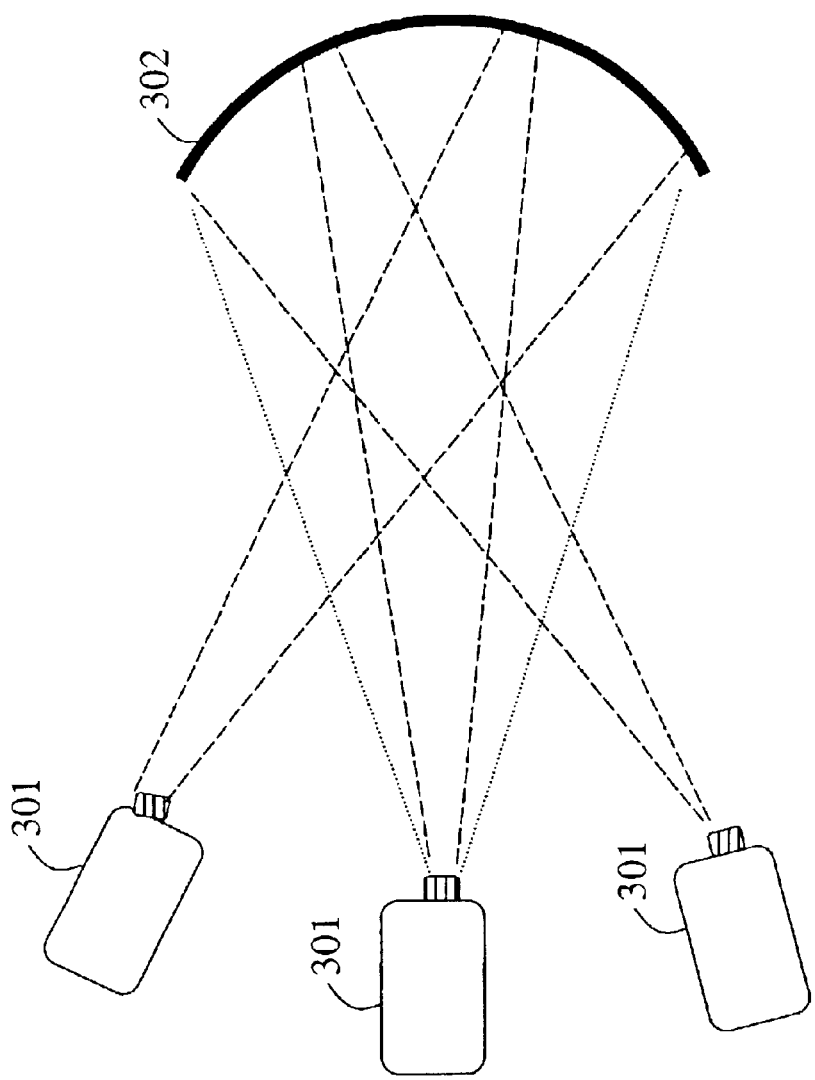
FIGS. 3 and 4 are diagrams a multi-projector system according to the invention.
Figure 4:
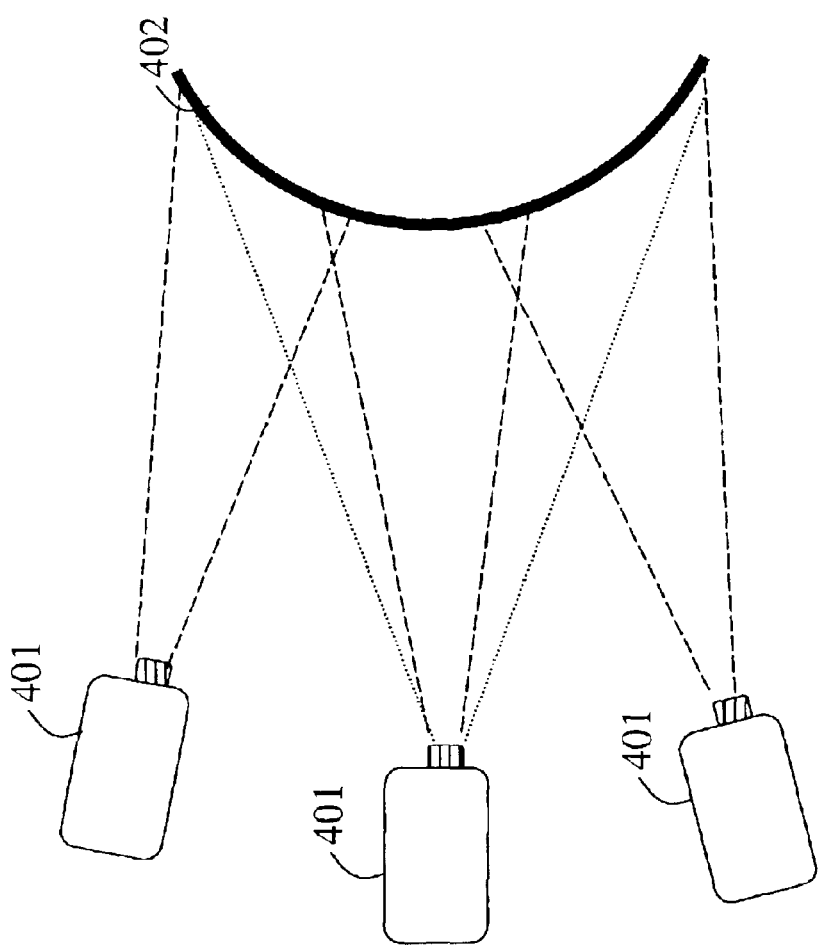
Figure 7:
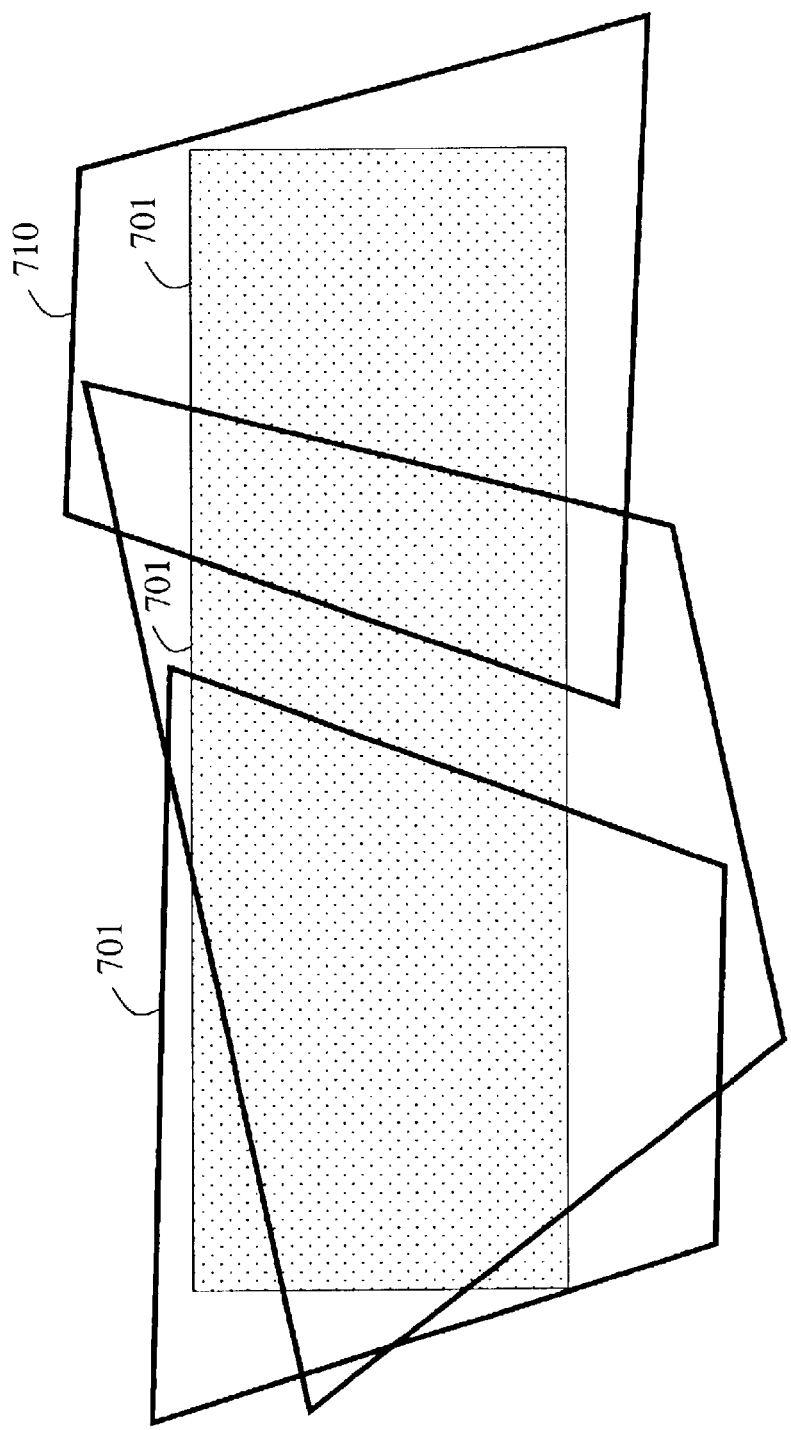
FIG. 7 is a block diagram of multiple overlapping images.

FIGS. 3 and 4 shows the basic set-up for a system according to the invention that uses one or more projectors 301 and 401 to display a seamless image on a convex or concave curved surface, for example, a concave dome 302 or a convex dome 402. If a single projector is used the projected image covers most of the display surface, see dotted lines, and if multiple projectors are used, the projected images partially overlap as shown by dashed lines. FIG. 7 shows how three multiple overlapping images 701 can produce a larger rectangular image 710.

Quadric Transfer Function

A mapping between two arbitrary perspective views of an opaque quadric surface, Q, in 3D can be expressed using a quadric transfer function, $\Psi$. The quadric surface can be a sphere, hemi-sphere, spheroid, dome, cylinder, cone, paraboloid, hyperboloid, hyperbolic paraboloid, or an ellipsoid. The quadric transfer function according to our invention means an image transfer function from a first view, e.g. a projector output image, to a second view, e.g., a camera input image, via a quadratic surface. While planar homography transfer functions can be determined from four or more pixel correspondences, the quadric transfer function requires nine or more correspondences. The quadric transfer function can be defined in a closed form using the 3D quadric surface, Q and additional parameters that relate perspective projection of the two views.

The quadric surface, Q, is represented by a 4×4 symmetric matrix, such that 3D homogeneous points X, expressed as a 4×1 vector, that lie on the surface satisfy the quadratic constraint, $X^T Q X = 0$. The quadric surface, Q, has nine degrees of freedom corresponding to the independent elements of the matrix. The matrix is symmetric and defined up to an overall scale.

The homogeneous coordinates of corresponding pixels, x in the first view and x in the second view are related by $$x' \cong Bx - (q^T x \pm \sqrt{((q^T x)^2 - x^T Q_{33} x)})e.$$

Figure 6:
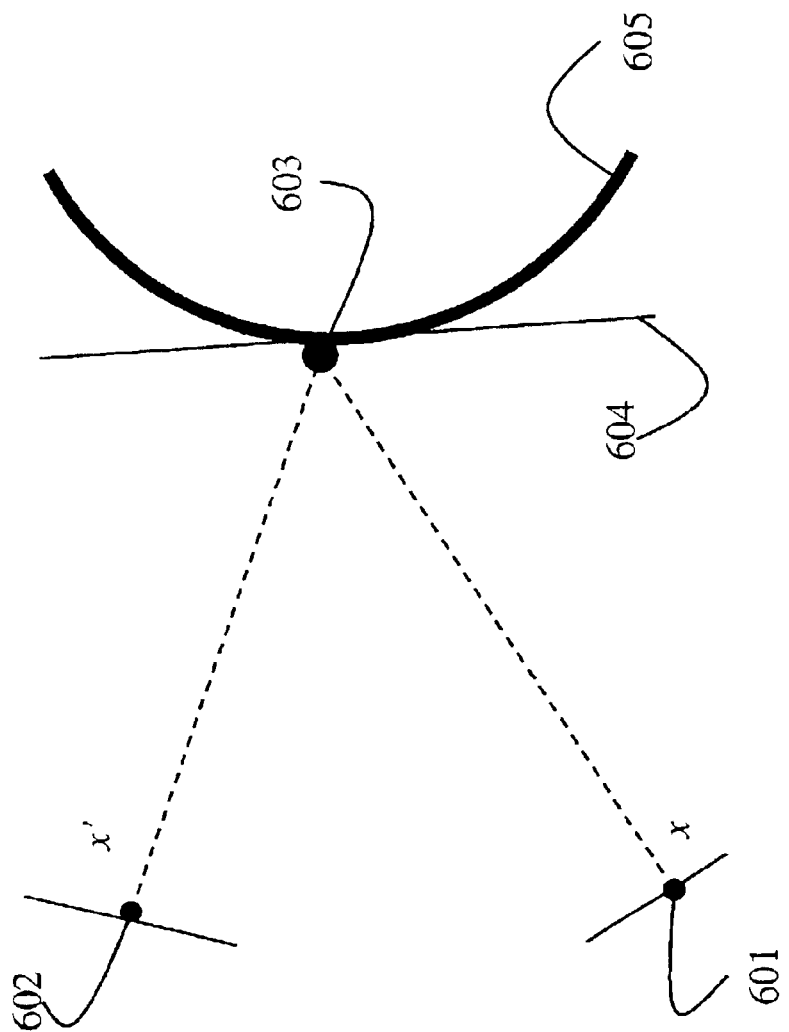
FIG. 6 is a diagram illustrating a homography according to the invention.

As shown in FIG. 6, B is a 3×3 homography matrix between the projected output pixel x 601 and the corresponding camera input pixel x' 602 via point 603 on a plane 604 tangential to the quadric surface 605 where the pixel 601 is visible.

Given pixel correspondences (x, x'), this equation is traditionally used to compute the 21 unknowns: the unknown 3D quadric surface Q, the 3×3 homography matrix B, and an epipole, e, in homogeneous coordinates. The epipole, e, is the center of projection of the first view in the second view. The symbol $\cong$ denotes equality up to scale for the homogeneous coordinates. The matrix Q is decomposed as follows $$Q = \begin{bmatrix} Q_{33} & q \\ q^T & 1 \end{bmatrix}.$$

Thus, $Q_{33}$ is the top 3×3 symmetric submatrix of Q, and q is a three-vector. Q(4, 4) is non-zero if the quadric surface does not pass through the origin, i.e., the center of projection of the first view. Hence, it can be safely assigned to be 1.0 for most display surfaces. The final 2D pixel coordinate for homogeneous pixel x' is (x'(1)/x'(3), x'(2)/x'(3)).

Simplification

The form described above is used by Shashua et al., 1994, and Wexler and Shashua, "Q-warping: Direct Computation of Quadratic Reference Surfaces," IEEE Conf. on Computer Vision and Pattern Recognition, CVPR, June, 1999. That form includes 21 variables, 4 more than needed. We remove part of that ambiguity by defining $A = B - eq^T$ $E = qq^T - Q_{33}$, and obtain the form used by our invention, $$x' \cong Ax \pm (\sqrt{x^T E x})e.$$

Here, $x^T E x = 0$ defines the outline conic of the quadric surface in the first view. The outline conic can be geometrically visualized as an image of the silhouette or the points on the surface where the view rays are locally tangent to the surface, e.g., the elliptical silhouette of a sphere viewed from outside the sphere.

The value A is the homography via the polar plane between the first view and the second view. Note that this equation contains, apart from the overall scale, only one ambiguous degree of freedom resulting from relative scaling of E and e. This ambiguity can be removed by introducing an additional normalization constraint, such as, E(3,3)=1.

Furthermore, the sign in front of the square root is fixed within the outline conic in the image. The sign is easily determined by testing the equation above with the coordinates for one pair of corresponding pixels. Note that the parameters of the quadric transfer function can be directly computed from nine or more pixel correspondences in a projective coordinate system. So it is tempting to follow an approach similar to estimating a planar homography for planar displays, without computing any Euclidean parameters. However, as described below, in practice it is difficult to estimate the epipolar relationship in many cases. Hence, we use a pseudo-Euclidean approach, as described below.

Pre-Processing

All registration information is pre-calculated relative to a pair of stereo images. We assume that the stereo camera views the entire 3D display surface. One of the camera images is arbitrarily selected as having an origin $c_o$. The stereo images are used to determine only the 3D points on the display surface. Hence, any suitable 3D acquisition system can be used.

Figure 1:
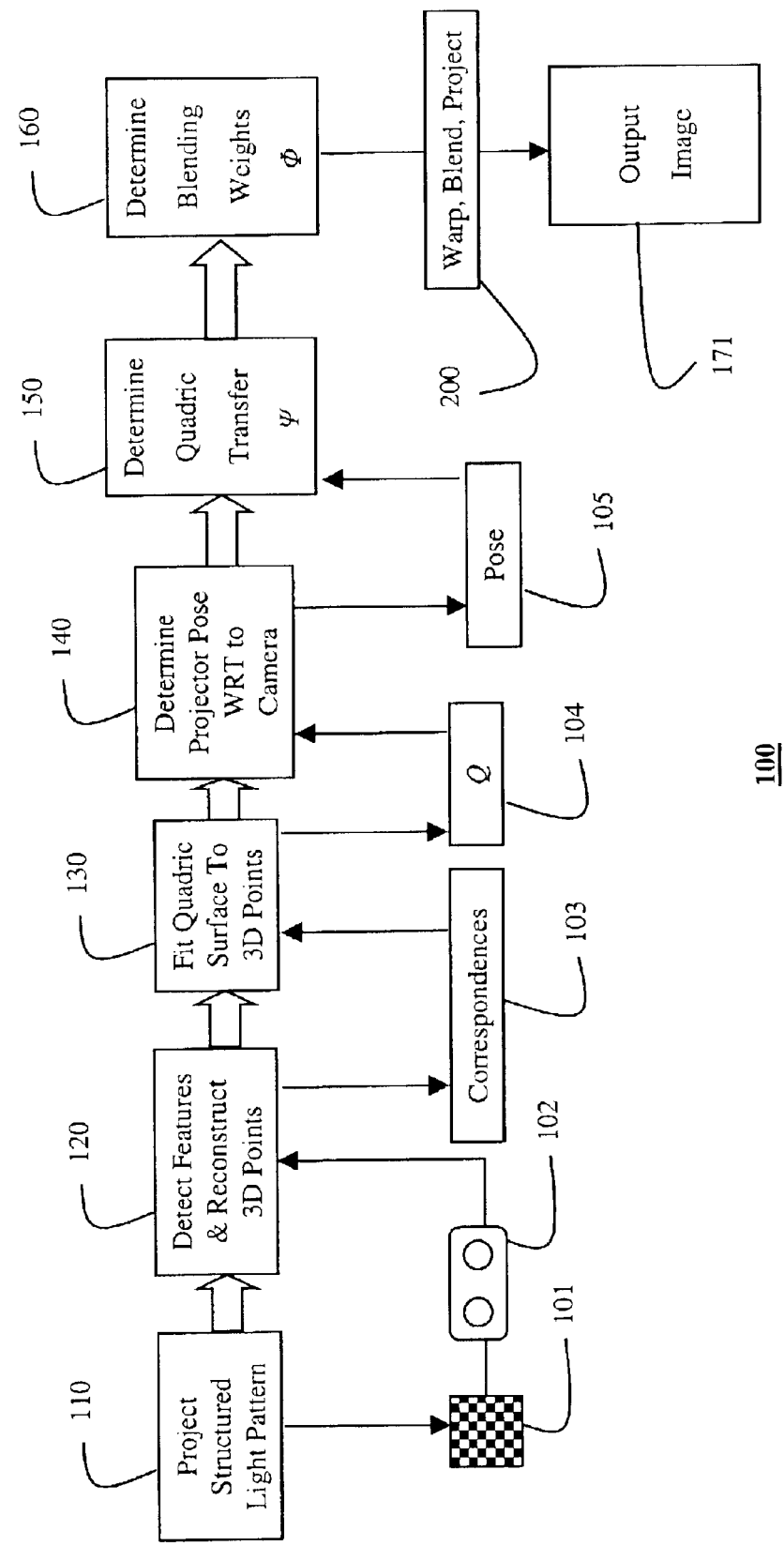
FIG. 1 is a flow diagram of pre-processing steps used by a method for projecting images onto a curved surface according to the invention.

As shown in FIG. 1, the basic steps of our pre-processing method 100 are as follows. The details of these steps are described below. For each projector i, a predetermined image 101, e.g., a structured pattern in the form of a checkerboard, is projected 110 onto the quadric surface.

In step 120, features in images acquired of the predetermined image 101 by the stereo camera 102 are detected, and 3D points are reconstructed, i.e., correspondences 103, on the quadric surface, which correspond with the features of the predetermined. Then, the quadric surface, Q 104 is fitted 130 to the detected correspondences.

For each projector i, a pose 105 of the projector, with respect to the camera, is determined 140 using the correspondence between projector pixels and 3D coordinates of points on the surface illuminated by the pixels. Determine 150 the quadric transfer function, $\Psi_i$ and its inverse $\Psi^i_i$, between the camera $c_o$ and projector i. Then, determine 160 intensity blending weights, $\Phi$, in regions where the projected images overlap. At this point, a projector image can be projected 200 by warping, blending and projecting to appear as an undistorted output image 171 on the quadric surface.

Run-Time Processing

Figure 2:
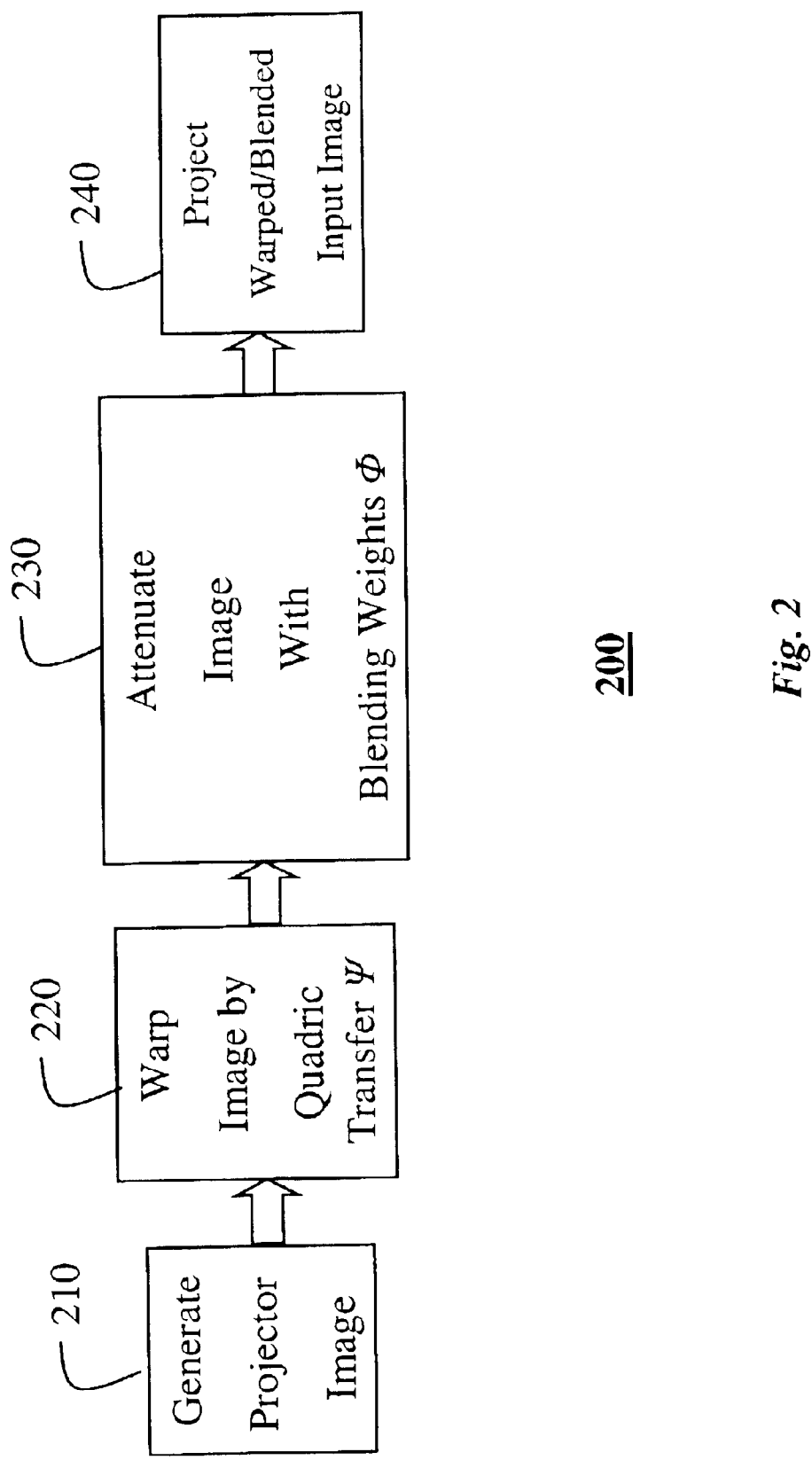
FIG. 2 is a flow diagram of rendering steps used by a method for projecting images onto a curved surface according to the invention.

FIG. 2 shows the basic steps of our rendering method 200. First, a projector image is generated 210. The projector image is represented as a texture mapped set of triangles. The image can be acquired by a still camera or a video camera, or the image can be generated by computer graphic rendering a 3D scene from a virtual viewpoint. The projector image is warped 220 into a frame of the projector according to the quadric transfer function $\Psi_{0i}$. Then, pixel intensities are attenuated 230 with blending weights $\Phi_i$ before projecting 240.

However, these steps involve several issues that need to be resolved. The quadric transfer function estimation, although a linear operation, requires non-linear optimization to reduce pixel re-projection errors. In addition, it is difficult to estimate the pose of the projector, i.e., the external parameters, because the 3D points projected on the quadric surface are usually nearly planar leading to a degenerate condition. These and other issues, and a practical solution are described below.

Calibration

We determine parameters of the quadric transfer function, $\Psi_{0i=\{A_i}, E_i, e_i\}$, so that the projected output images are geometrically registered on the curved surface. The prior art methods, known for cameras, determine the quadric transfer parameters directly from pixel correspondences. That involves estimating the 4×4 quadric matrix, Q, in 3D using a triangulation of corresponding pixels and a linear method. If the internal parameters of the two views are not known, all the calculations are done in projective space after computing the epipolar geometry, i.e., the epipoles and the fundamental matrix.

However, if projectors rather than cameras are involved, the linear method produces very large re-projection errors in estimating the 3D quadric surface, Q. The errors are of the order of about 30 pixels for a conventional XGA projector.

There are several reasons for this. It is relatively straightforward to calibrate a camera directly from acquired images. However, projector calibration can only be done indirectly by analyzing images of projected images acquired by a camera. This can introduce errors. In addition, in a projector, the internal optics are usually offset from the principle point to project images upwards. Thus, the projector internal parameters are hard to estimate, and they are different than those of a camera. Furthermore, the fundamental matrix is inherently noisy given that the 3D points on the quadric surface illuminated by a single projector do not have significant depth variation in display settings such as segments of spherical or cylindrical surfaces.

Therefore, the invention uses a pseudo-Euclidean approach where the internal and external parameters of the camera and the projectors are known approximately. These parameters are used to estimate Euclidean rigid transformations. Hence, unlike the planar case, computation of an accurate image transfer function for curved screens involves three-dimensional quantities.

Quadric Surface

We use a rigid stereo camera pair, $C_0$ and $C'_0$, as a base for computing all geometric relationships. We arbitrarily select one of the cameras to define the origin and coordinate system We calibrate a baseline stereo pair with the checkerboard pattern 101. For our calibration, the cameras do not necessarily have to be located at the sweet-spot, which is an important difference with respect to some of the prior art non-parametric approaches.

The stereo pair of cameras 102 observes the structured patterns projected by each projector. Using triangulation, a set of N 3D points, $\{X_j\}$ on the display surface, that correspond to pattern features, are detected. The quadric surface, Q, passing though each $X_j$ is computed by solving a set of linear equations, $X^T jQX_j=0$, for each 3D point. This equation can be written in the form $X_iV=0$, where $X_i$ is a 1×10 matrix, which is a function of $X_i$ only and V is a homogeneous vector containing the distinct independent unknown variables of the quadric surface Q. With $N \geq 9$, we construct a N×10 matrix X, and solve the linear matrix equation XV=0.

Given points in general position, the elements of V, and hence Q, are the one dimensional null-space of the matrix X.

Projector View

In addition to the quadric surface, Q, we need to know the internal and external parameters of each projector with respect to the origin of the camera. We use the correspondence between the projector pixels and coordinates of the 3D points they illuminate to compute the pose and internal parameters.

However, finding the pose of a projector from known 3D points on the quadric surface is error-prone because the 3D points are usually quite close to a plane leading to an unstable solution, see Faugeras, *Three-dimensional computer vision: a geometric viewpoint*, MIT Press, 1993, and Forsyth et al., "*Computer Vision, A Modern Approach*," FUTURESLAB, 2002, ActiveMural, Argonne National Labs, 2002.

Dealing with near-planar points is a difficult problem. If points are distributed in depth, then we can easily use a linear method to estimate the internal as well as the external parameters of the projector. On the other hand, if the points are known to be planar, then we can estimate the external parameters when some of the internal parameters are known, For dealing with near-planar surfaces, we use an iterative procedure. If we know the projector internal parameters, we can first find an initial guess for external parameters based on homography and then use an iterative procedure based on Lu et al., "*Fast and globally convergent pose estimation from video images*," IEEE Transactions on Pattern Analysis and Machine Intelligence, Vol. 22:6, pp. 610–622, 2000. Powell's method can be used for non-linear refinement of reprojection error. However, estimating projector internals is equally difficult. If the projectors cannot be easily moved, as mentioned above, then calibrating the projectors usually requires large surfaces illuminated in two or more positions.

Our strategy is to use projector internal parameters that are approximately known. We find internal parameters of just one projector and use these internal parameters for all projectors. At a later time, the same and other projectors will probably have different zoom settings and other mechanical or optical deviations. In addition, the external parameters computed by iterative method of Lu et al. is only approximate.

Camera to Projector Transfer

Therefore, we use perspective projection parameters of the camera along with approximate projection matrix of the projector to find the camera to projector quadric transfer using linear methods. Then, we refine the solution using non-linear optimization.

The quadric transfer parameters, $\Psi_{0i} = \{A_i, E_i, e_i\}$ are easy to calculate from the quadric surface Q, the camera projection matrix [I|0], and the projector projection matrix $[P_i|e_i]$ by $$A_i = P_i - e_i q^T \quad E_i = qq^T - Q_{33}.$$

As stated above, the prior art linear method for finding the parameters is too imprecise for our purpose. Misalignment on the display screen can be as much as 15–30 pixels per projector resulting in annoying visual artifacts. A seamless display requires sub-pixel accuracy. Therefore, we apply a non-linear minimization to refine the results obtained via the linear method. This can be done with an objective or 'cost' function.

For the objective function, we take the total squared transfer error for all pixels $$\varepsilon_1 = \sum_j \left( \frac{x_i^j(1,2)}{x_i^j(3)} - \frac{\hat{x}_i^j(1,2)}{\hat{x}_i^j(3)} \right)^2,$$

where $\hat{x}_i^j$ are the transferred pixels for each known projected pixel $x_j$, i.e., pattern feature points, expressed as:

$$\hat{x}_i^j = A_i x_i^j \pm \sqrt{x_i^{jT} E_{i_{x_i}}}.$$

Note that the sign found using the linear method, which is same for all the pixels, remains the same during the non-linear optimization, e.g., the well known Nelder-Mead Simplex.

Partial Euclidean Reconstruction

One could ignore the Euclidean approach altogether, and proceed directly to projective space and non-linear optimization. If we have accurate projector internal parameters, then the non-linear optimization stages could be avoided. However, as mentioned earlier, ignoring Euclidean viewing parameters and solving the quadric transfer function purely from pixel correspondences leads to poor re-projection errors. Furthermore, the estimated 3D quadric surface, Q, cannot be used as an estimate for further non-linear optimization because the solution did not converge.

Accurate internal projector parameters only reduces the re-projection errors but do not eliminate the errors. This is because, many kinds of errors are propagated in the three dimensional Euclidean calculations, including estimating 3D points on the display surface by triangulation, estimating the 3D quadric surface using linear methods and finding the pose of the projector. The non-linear optimization attempts to minimize the physical quantity we care about the most, i.e., pixel re-projection error in image transfer from the camera to the projector for a known corresponding set of pixels.

Because the correspondence between overlapping projector pixels is indirectly defined by this image transfer function, minimizing pixel re-projection errors ensures geometric registration between the displayed pixels of the projectors.

Rendering

The rendering involves a two-pass approach. For 2D image data, we extract the appropriate input image. For 3D scenes, we first render the 3D models according to the sweet-spot. In the second pass, the resultant image is then warped into the projector image space using the quadric image transfer function.

Virtual View

When 3D scenes are displayed on a curved screen, the images are perspectively correct only from specific points in space, Such as point is popularly known as the sweet-spot or the virtual viewpoint. For a concave hemispherical surface, the sweet-spot is on a line through the center of the sphere, perpendicular to the cut-plane that cuts the sphere in half. For a convex hemispherical surface, the sweet-spot can be mirrored through the surface. For a cylindrical surface, the sweet spot is similarly located, unless projected image wraps around the entire surface, in which case the sweet-spot can be anywhere. The sweet-spot is independent of the camera's focal length, but dependent on the shape and size of the curved display, and the peripheral viewing angle. The projected imagery can appear in front of, or behind the display surface depending on the location of the sweet-spot and the focal length of the virtual camera or viewer. As the viewer moves away from the sweet-spot, the images look distorted. In addition, one needs to specify the view frustum i.e., the viewing direction or principal axis, and the extent or field of view.

For some displays, it is possible to automatically determine the sweet-spot. For example, for a concave spherical dome, the center of the dome can be considered a good sweet-spot. The sweet-spot can be determined directly from the equation of the quadric surface, Q, i.e., Q(1, 1)q. For a cylindrical screen, a point on the axis of the cylinder that is midway along the extent of the cylinder is a good choice. Sometimes, the sweet-spot is decided by practical considerations e.g., a spot that is approximately at eye-level is considered ideal because images are almost always aligned with the horizontal and vertical axes of the real world.

In our case, the virtual viewpoint can be interactively fixed or moved because we have an approximate Euclidean reconstruction of the display geometry. Because the 3D coordinates of the location are known in the camera coordinate system, it is relatively simple to locate the sweet-spot with respect to the camera.

Sweet-Spot from Surface Points

When it is difficult to determine the parameters of the virtual viewpoint for rendering, one technique finds the best-fit plane to the set of points found on the illuminated part of the display surface. We fit an oriented bounding box (OBB) to the set of 3D points $\{X_i\}$ on the display surface. A point at a suitable distance in front of the screen, along the vector passing through the center of this box and normal to the best-fit plane can be selected as the sweet-spot. Because all the 3D points on a quadric surface lie on the convex hull of those 3D points, the OBB can be determined as follows.

If Y is an N×3 matrix of $(X_i - \bar{X}$ where $\bar{X} = (\bar{x}, \bar{y}, \bar{z})$ is the centroid of the N 3D points, then the eigenvector corresponding to the smallest eigenvalue of the 3×3 matrix $Y^T Y$ gives the normal to the best-fit plane i.e., the axis of minimum variance. On the other hand, the largest side of the OBB, i.e., the extent of the 3D points projected in the best-fit plane, gives the approximate 'diameter' of the screen. The distance of sweet-spot in front of the screen can be selected to be proportional to this diameter, depending on the application and the desired field of view.

For immersive applications, a large field of view is desired. Hence, the distance should be about half of the diameter. For group viewing, the distance can be comparable to the diameter.

We recalculate the quadric transfer function $\Psi_i$ between the virtual view image space and each projector output image. The process is very similar to computing $\Psi_i \Psi_{0i}$. First, we find the projection of 3D points on the quadric surface into the virtual view image space. Then, the correspondence between the virtual view and the projector image and the internal and external parameters of the virtual view and projector are sufficient to update $\Psi_i$.

Display Area

The view frustum for the virtual view is defined using the sweet-spot and the extents of the OBB. The viewing—at vector is from the virtual viewpoint toward the center of the OBB. Because the union of overlapping images from multiple projectors can illuminate a large area, we can 'crop' the view frustum to an aesthetic shape such as a rectangle or a circle. For 3D applications, we render a set of black quadrilaterals to crop regions outside the desired display area. For example, for a rectangular view, the view port is made by four large quadrilaterals near the outer edge of the view port in the projector's image. The black quadrilaterals along with the rest of the 3D models are rendered and warped as described below. For 2D applications, the area outside the input image to be displayed is considered black.

Image Transfer

Given a 3D vertex, M, in a scene to be rendered, we find its screen space coordinates, m, in the virtual view. Then, we find the transferred pixel coordinate, $m_i$, in the output image of projector i, using the quadric transfer function, $\Psi_{0i} = \{A_i, E_i, e_i\}$. The polygons in the scene are then rendered with vertices M replaced with vertices $m_i$. Thus, the rendering process at each projector is very similar. Each projector frame buffer automatically stores the appropriate part of the virtual view image, and there is no need to explicitly determine extents of the projector.

Therefore, to render, at each projector, for each vertex M, determine pixel m via a virtual view projection (M), and determine a warped pixel $m_i$ via the quadric transfer function $\Psi_i(m)$, then
for each triangle T with vertices $\{M_j\}$,
render triangle with 2D vertices $\{m_{ji}\}$.

There are two issues with this approach. First, only the vertices in the scene, but not the polygon interiors, are accurately warped. Second, visibility sorting of polygons needs special treatment. After the quadric transfer, the edges between vertices of the polygon should theoretically map to second-degree curves in the projector's image.

However, scan conversion converts the curves to straight-line segments between the warped vertex locations. This problem is not discernible for a single projector. However, in the case of overlapping projectors, this causes individual different deviations from the original curve, and hence, the edge appears to be mis-registered on the display screen. Therefore, it is necessary to use sufficiently fine tessellation of triangles.

Commercial systems are already available that tessellate and pre-distort the input models on the fly so that they appear straight in a perspectively correct rendering on the curved screen, see U.S. Pat. No. 6,104,405, "Systems, methods and computer program products for converting image data to non-planar image data," issued to Idaszak et al. on Feb. 26, 1997, and U.S. Pat. No. , 5,319,744, "Polygon fragmentation method of distortion correction in computer image generating systems," issued to Kelly et al. on Jun. 7, 1994, incorporated herein by reference. Our method is compatible with fine tessellation provided by such systems. Pre-distortion of the scene geometry in commercial systems is used to avoid the two-pass rendering, which involves texture-mapping result of the first pass. In our case, instead of pre-distorting the geometry, we pre-distort the image space projection. As an advantage, our invention can be implemented in part with a vertex shader of a programmable graphics unit (GPU).

Scan Conversion

When pixel locations in the projection of a triangle are warped, information needs to be passed along so that the depth buffer generates appropriate visibility information. In addition, for perspectively correct color and texture coordinate interpolation, appropriate weight values 'w' need to be passed. Therefore, we post-multiply the pixel coordinates with 'w' according to $$m(x, y, z, w) = VirtualViewProjection(M(X))$$
$$m_i(x_i', y_i', w_i') = \Psi_i(m(x/w, y/w), 1)$$
$$m_i(x_i, y_i, z_i, w_i) = [wx_i'/w_i', wy_i'/w_i', z, w].$$

Thus, vertex $m_i$ has appropriate final pixel coordinate $(x_i'/w_i', y_i'/w_i')$ due to the quadric transfer function along with original depth and w values.

FIG. 5 shows the code 500 for the vertex shader. For rendering 2D images, we densely tessellate the virtual view image space into triangles, and map the image as a texture on these triangles. Vertex, m, of each triangle is warped using the quadric transfer function into vertex (and pixel) $m_i$ as above. Scan conversion automatically transfers colors and texture attributes at vertex m to vertex $m_i$, and interpolates in between. It is possible to render 3D scenes in a similar manner.

Note that our warping of a projector image using a quadric transfer function is different than rendering a quadric curve on a flat surface, see Watson et al., "A fast algorithm for rendering quadratic curves on raster displays," Proc. 27$^{th}$ Annual SE ACM Conference, 1989.

Intensity Blending

Pixels intensities in the areas of overlapping images are attenuated using alpha blending of the graphics hardware. Using the parametric equations of the quadric transfer function, the alpha maps are determined as follows.

For every projector pixel, $x_i$ in projector i, we find the corresponding pixels in projector j using the equation $$x_j = \Psi_{0j}(\Psi_{0i})^{-1}(x_i).$$

For cross-fading, pixels at the boundary of the projector's image are attenuated. Hence, the weights are proportional to the shortest distance from the frame boundary. The weight assigned to pixel $x_i$, expressed in normalized window pixel coordinates $(u_i, v_i)$, which are in the range [0, 1], is $\Phi_i(x_i)$ $\cong d(x_i)/\Sigma_j d(x_j)$, where, $d(x)$ is $\min(u, v, 1-u, 1-v)$ if $0 \leq u, v \leq 1$, else $d(x)=0$. Because we use a parametric approach, we are able to compute corresponding projector pixels and the weights at those locations at sub-pixel registration accuracy. The sum of weights at corresponding projector pixels accurately adds to 1.0.

At each projector, the corresponding alpha map is stored as a texture map and rendered as screen aligned quadrilaterals during the last stage of the rendering.

Our method can also be used to project onto a convex dome. This projecting is particularly useful when the dome was made of translucent or transparent material. When the projection is from the rear, the viewer can experience a fully immersive experience without blocking any of the projectors.

Effect of the Invention

The invention enables the construction of projector systems with curved display surfaces for 2D or 3D visualization. Our system does not require an expensive infrastructure, and can be operated with casual alignment between multiple projectors and the display surface. Our automatic registration exploits a quadric image transfer function, and eliminates tedious setup and maintenance of projectors, and hence reduces cost. The invention can simplify the construction, calibration and rendering process for widely used applications such as used in flight simulators, planetariums and high-end visualization theaters. New applications enabled include low-cost, flexible dome displays, shopping arcades and projection on cylindrical columns or pillars.

The invention provides an elegant solution to a problem that has so far been solved by discrete sampling. An advantage is that, unlike prior art systems, our projectors do not need to be placed at the sweet-spot. This is important in real-world applications where the sweet-spot is usually exactly where viewers would like to be.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for projecting an image onto a display surface, comprising:
   projecting a predetermined image onto a display surface;
   acquiring a stereo pair of images of the predetermined image;
   determining a quadric transfer function between the predetermined image and the stereo pair of images via the display surface;
   warping an output image according to the quadric transfer function; and
   projecting the warped output image onto the display surface.

2. The method of claim 1 wherein the display surface is quadric.

3. The method of claim 2 wherein the display surface is selected from a group consisting of a sphere, hemisphere, spheroid, dome, cylinder, cone, paraboloid, hyperboloid, hyperbolic parabaloid, and ellipsoid.

4. The method of claim 2 wherein the quadric surface is concave.

5. The method of claim 2 wherein the quadric surface is convex.

6. The method of claim 1 further comprising:
   projecting a plurality of predetermined images onto the display surface from a plurality of viewpoints;
   acquiring a stereo pair of input images of the plurality of predetermined images;
   determining a quadric transfer function between each predetermined image and the stereo pair of input images via the display surface;
   warping a plurality of output images according to the corresponding quadric transfer function; and
   projecting the plurality of warped output images onto the display surface from the plurality of viewpoints.

7. The method of claim 6 wherein the surface is quadric.

8. The method of claim 6 wherein the plurality of warped output images overlap and appear as a single seamless image.

9. The method of claim 1 further comprising:
   determining three-dimensional correspondences between features of the predetermined image and corresponding features in the stereo pair of images;
   fitting a quadric surface to the three-dimensional correspondences;
   determining a pose of the predetermined image with respect to the stereo pair of images; and
   determining the quadric transfer function from the pose and the correspondences.

10. The method of claim 6 further comprising:
    attenuating the plurality of warped output images according to blending weights before projecting.

11. The method of claim 1 wherein the predetermined image is a checkerboard pattern.

12. The method of claim 1 further comprising:
    applying non-linear minimization to an objective function to obtain the quadric transfer function.

13. The method of claim 12 wherein the objective function takes a total squared transfer error for all pixels in predetermined image.

14. The method of claim 1 wherein the output image is rendered for an arbitrary virtual viewpoint.

15. The method of claim 10 further comprising:
    cropping the plurality of attenuated and warped output images to an arbitrary view frustum.

16. The method of claim 1 wherein the quadric transfer function is determined parametrically.

17. The method of claim 1 wherein the warping is implemented with a vertex shader of a graphic processing unit.

18. A system for projecting an image onto a display surface, comprising:
    a projector configured to project a predetermined image onto a display surface;
    a camera configured to acquire a stereo pair of images of the predetermined image;
    means for determining a quadric transfer function between the predetermined image and the stereo pair of images via the display surface;
    means for warping an output image according to the quadric transfer function; and
    means for projecting the warped output image onto the display surface.

* * * * *